United States Patent [19]
Nakata et al.

[11] Patent Number: 5,684,373
[45] Date of Patent: Nov. 4, 1997

[54] ENCODER OUTPUT METHOD AND SERVO MOTOR ENCODER

[75] Inventors: Tomio Nakata; Kenji Shiroshita, both of Iida, Japan

[73] Assignee: Tamagawa Seiki Kabushiki Kaisha, Nagano-ken, Japan

[21] Appl. No.: 650,857

[22] Filed: May 20, 1996

[30] Foreign Application Priority Data

Apr. 2, 1996 [JP] Japan .................................. 8-080261

[51] Int. Cl.$^6$ .............................. H03M 1/24; H03D 13/00
[52] U.S. Cl. .................................... 318/602; 318/652
[58] Field of Search .................................... 318/600–605, 318/652, 661

[56] References Cited

U.S. PATENT DOCUMENTS

| | | | |
|---|---|---|---|
| 4,978,954 | 12/1990 | Koike | 341/1 |
| 4,982,146 | 1/1991 | Moteki | 318/696 |
| 5,140,240 | 8/1992 | Okutani | 318/608 |

*Primary Examiner*—Bentsu Ro
*Attorney, Agent, or Firm*—Sughrue, Mion, Zinn, Macpeak & Seas, PLLC

[57] ABSTRACT

In an encoder output method and a servo motor encoder according to the present invention, the number of signal lines is reduced by using common signal lines and common output terminals. In the encoder output method and the servo motor encoder, incremental signals (A, B, Z) and servo motor magnetic pole position detection signals (UE, VE, WE) are switchably output by a common driver (2) through a pair of timers and a multiplexer (30), or a pair of timers and two line drivers (60, 70) are selectively active or inactive, and common signal lines are used, thereby reducing the number of signal lines.

3 Claims, 4 Drawing Sheets

FIG. 1
PRIOR ART
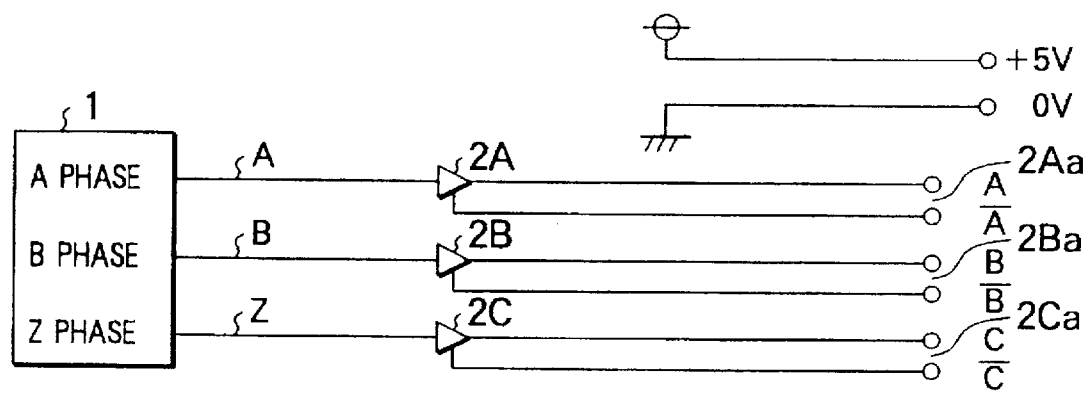
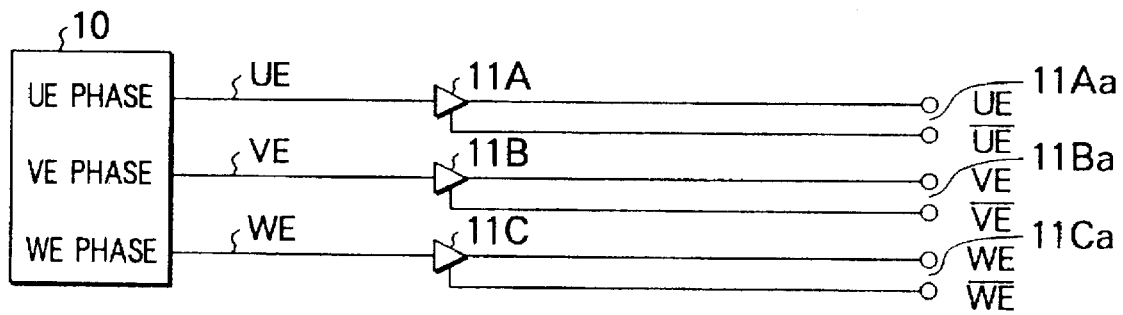

ENCODER OUTPUT METHOD AND SERVO MOTOR ENCODER

BACKGROUND OF THE INVENTION

1. Field of the Invention

The present invention relates to an encoder output method and a servo motor encoder and, to novel improvement to decrease the number of signal lines by using common signal lines and common output lines.

2. Prior Art

As a conventionally used servo motor encoder of this type, an arrangement shown in FIG. 1 is generally employed.

More specifically, reference numeral 1 in FIG. 1 denotes an incremental signal generator for outputting three phase (A-phase, B-phase, and Z-phase) incremental signals A, B, and Z. The incremental signals A, B, and Z are input to first driver sections 2A, 2B, and 2C, respectively, and output incremental signals A, Ā, B, B̄, Z, and Z̄ whose phases are different from each other are output from pairs of output terminals 2Aa, 2Ba, and 2Ca which are connected to first driver sections 2A, 2B, and 2C.

Reference numeral 10 denotes a servo motor magnetic pole position detection signal generator for outputting of three phase (UE-phase, VE-phase, and WE-phase) servo motor magnetic pole position detection signals UE, VE, and WE. The servo motor magnetic pole position detection signals UE, VE, and WE are input to second driver sections 11A, 11B, and 11C, respectively, and output servo motor magnetic pole position detection signals UE, ŪE, VE, V̄E, WE, and W̄E whose phases are different from each other are output from pairs of output terminals 11Aa, 11Ba, and 11Ca connected to the second driver sections 11A, 11B, and 11C, respectively.

Therefore, the output incremental signals A, Ā, to Z, and Z̄ are used for positional detection, and the output servo motor magnetic pole position detection signals UE, ŪE to WE, and W̄E are used to switch drive coils of a servo motor (not shown).

Since a conventional servo motor encoder is arranged as described above, the following problem is posed.

More specifically, since the output incremental signals and output servo motor magnetic pole position detection signals are output from the drivers through the output terminals of devoted signal lines, respectively, a large number of signal lines (12 signal lines) used for outputting of the encoder are required. Assembling and connection of the signal lines are serious trouble in assembling of the encoder. In addition, since a large number of signal lines are used, the circuit arrangement of a signal processing section serving as a receiver is complex.

SUMMARY OF THE INVENTION

The present invention has been made to solve the above problem, and has as its object to provide a servo motor encoder which is designed such a manner that the number of signal lines is reduced by using common signal lines and common output terminals.

According to the present invention, there is provided an encoder output method comprising the steps of generating three phase incremental signals from an incremental signal generator through a line driver, and outputting three phase servo motor magnetic pole position detection signals from a servo motor magnetic pole position detection signal generator through the line driver, characterized in that after a power supply is turned on, a high-impedance state from the line driver is output in synchronism with a first timer output from a first timer, and the servo motor magnetic pole position detection signals and the incremental signals are output in synchronism with a second timer output from a second timer.

According to the present invention, there is provided a servo motor encoder having an incremental signal generator for generating three phase incremental signals (A, B, Z) and a servo motor magnetic pole position detection signal generator for generating three phase servo motor magnetic pole position detection signals (UE, VE, WE), comprising a multiplexer which receives the signals (A, B, Z, UE, VE, WE) and has three switching sections, one line driver connected to the multiplexer and having driver sections corresponding to the switching sections, a first timer connected to the line driver, a pair of output terminals connected to the driver sections, and a second timer connected to the multiplexer, characterized in that after a power supply is turned on, a high-impedance state from the line driver is output in synchronism with a first timer output from the first timer, and the servo motor magnetic pole position detection signals and the incremental signals (A, B, Z) are output in synchronism with a second timer output from the second timer.

According to the present invention, there is provided a servo motor encoder having an incremental signal generator for generating three phase incremental signals (A, B, Z) and a servo motor magnetic pole position detection signal generator for generating three phase servo motor magnetic pole position detection signals (UE, VE, WE), comprising a first line driver having three first driver sections corresponding to the incremental signals (A, B, Z), a second line driver having three second drivers corresponding to the servo motor magnetic pole position detection signals (UE, VE, WE), a pair of output terminals respectively connected to the first drivers, and first and second timers connected to an enable terminal of the first line driver and a disable terminal of the second line driver, characterized in that after a power supply is turned on, a high-impedance state from the line drivers is output in synchronism with a first timer output from the first timer, and the servo motor magnetic pole position detection signals and the incremental signals (A, B, Z) are output in synchronism with a second timer output from the second timer.

BRIEF DESCRIPTION OF THE DRAWINGS

FIG. 1 is a block diagram showing a conventional arrangement;

DESCRIPTION OF THE PREFERRED EMBODIMENTS

Figure 2:
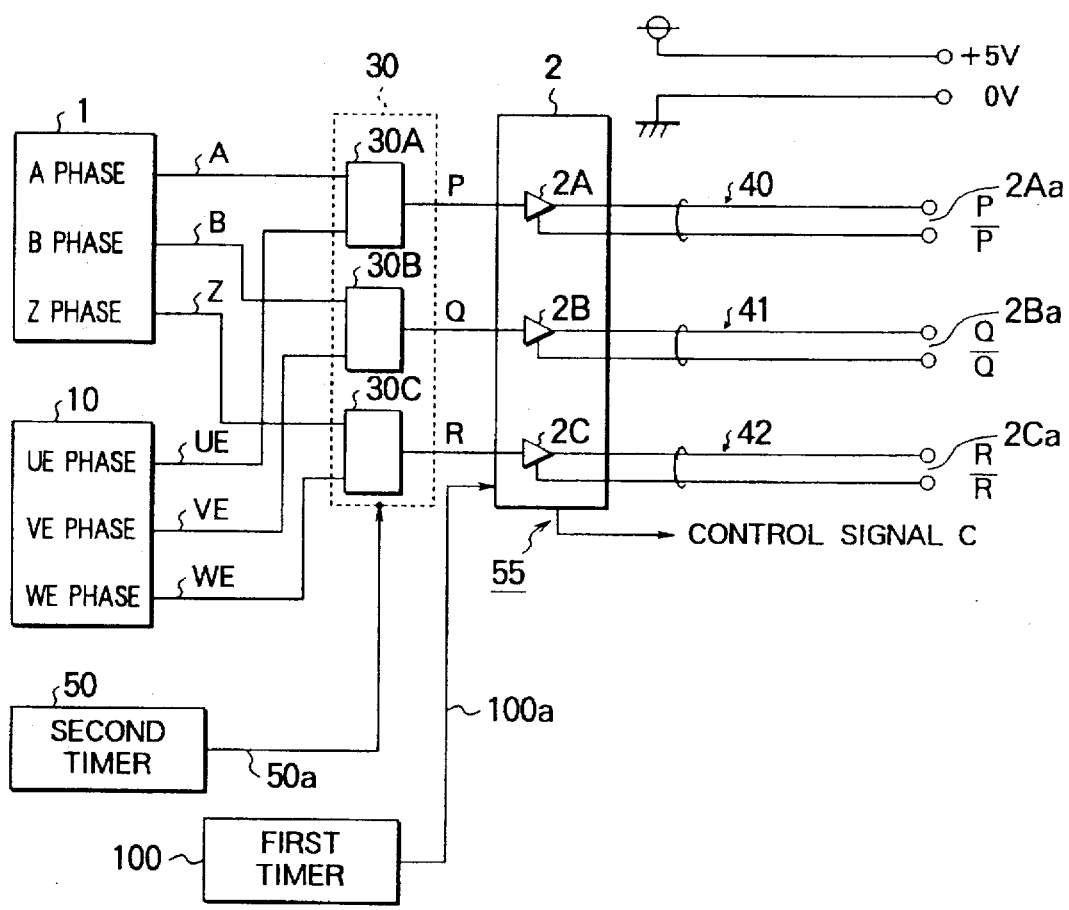
FIG. 2 is a block diagram showing a servo motor encoder according to the present invention.

A preferred embodiment of an encoder output method and a servo motor encoder according to the present invention will be described below with reference to the accompanying drawings. Note that the same reference numerals as in the prior art denote the same parts in this embodiment.

Reference numeral 1 in FIG. 2 denotes an incremental signal generator for outputting three phase (A-phase, B-phase, and Z-phase) incremental signals A, B, and Z. The incremental signals A, B, and Z are input to a multiplexer 30 having three switching sections 30A, 30B, and 30C, respectively. Outputs P, Q, and R from the switching sections 30A, 30B, and 30C are input to three driver sections 2A, 2B, and 2C of a line driver 2, respectively. Since the line driver 2 is generally constituted by four circuits, an H- or L-level control signal C is output from the remaining circuit such that the incremental signals A, B, and Z output from output terminals 2Aa to 2Ca (to be described later) can be distinguished from the servo motor magnetic pole position detection signals UE, VE, and WE.

Pairs of output terminals 2Aa, 2Ba, and 2Ca are connected to pairs of signal lines 40, 41, and 42 connected to the driver sections 2A, 2B, and 2C, and a first timer output 100a from a first timer 100 is input to the line driver 2. A second timer 50 has an arrangement in which a timer signal 50a is inverted a predetermined period of time after a power supply is turned on is connected to the multiplexer 30.

An operation of the above arrangement will be described below. When the power supply of an encoder 55 is turned on, the incremental signals A, B, and Z and the servo motor magnetic pole position detection signals UE, VE, and WE are input to the switching sections 30A to 30C of the multiplexer 30 through a known rotatable sign disk (not shown).

Figure 3:
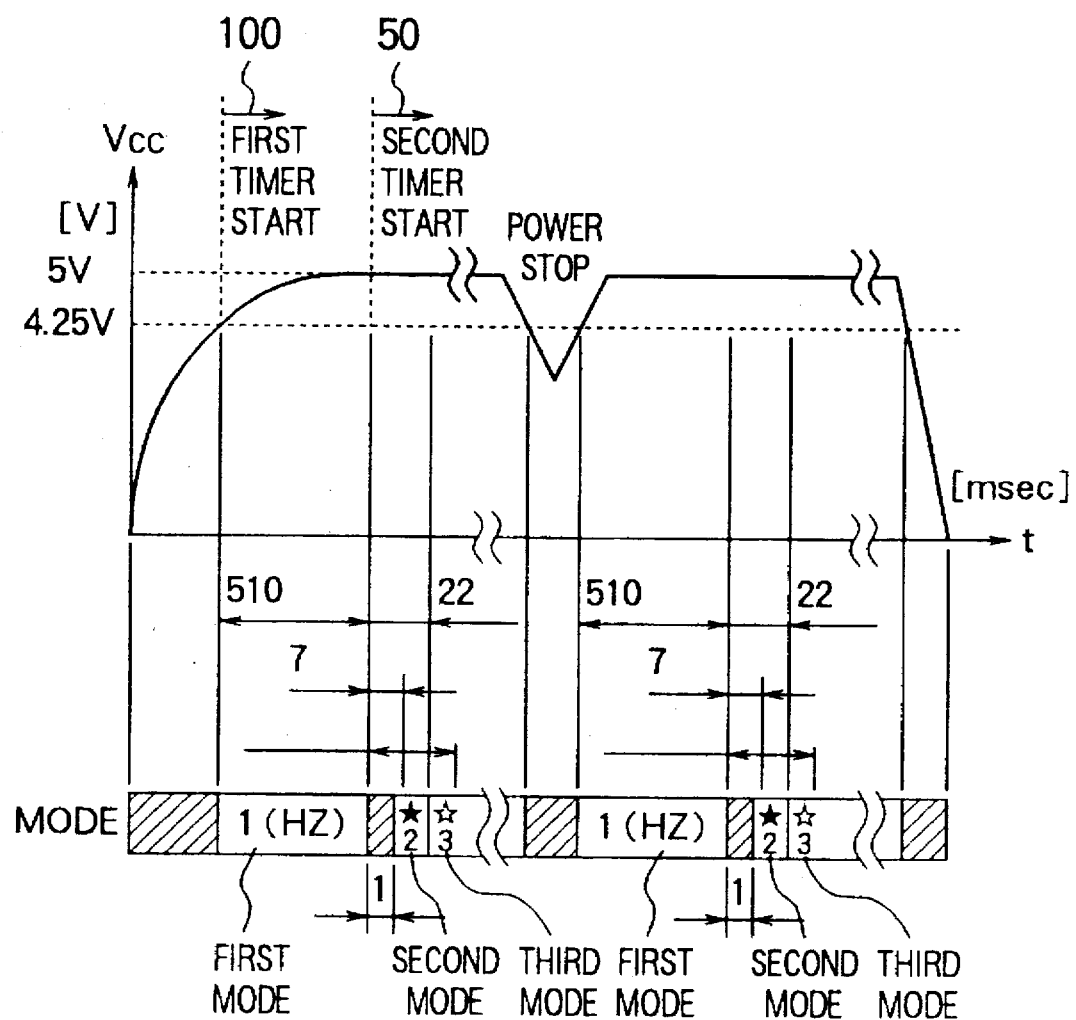
FIG. 3 is a waveform chart showing timer signals and an output state.

In the above case, as shown in FIG. 3 and Table 1 described later, after the power supply is turned on, when a power supply voltage Vcc rises to, e.g., 4.25 V, the first timer 100 is started, and a high-impedance state HZ is output (first mode) from the line driver 2 in synchronism with a first timer output 100a. Thereafter, when the first timer output 100a is ended, and the power supply voltage Vcc is set to be, e.g., 5 V, the second timer 50 is started. At this time, the second mode is started, and the outputs P, Q, and R are output from the output terminals 2Aa, 2Ba, and 2Ca through the signal lines 40, 41, and 42 when the signals UE, VE, and WE are output. When the timer output 50a goes to H level, the switching sections 30A to 30C are switched, and the outputs P, Q, and R are switched to the signals A, B, and Z. Note that the signals UE, VE, and WE and the signals A, B, and Z can be output in a manner-reverse to the above manner depending on the level of the timer output 50a. The signals A, B, Z, UE, VE, and WE can be distinguished from each other by the control signal C after the high-impedance state is canceled. A voltage level at which the timers 50 and 100 are started can be set to be a level other than the above level.

TABLE 1

| Function Mode | | |
|---|---|---|
| First mode | Second Mode | Third mode |
| HZ | UE | A |
| HZ | $\overline{\text{UE}}$ | $\overline{\text{A}}$ |
| HZ | VE | B |
| HZ | $\overline{\text{VE}}$ | $\overline{\text{B}}$ |
| HZ | WE | Z |
| HZ | $\overline{\text{WE}}$ | $\overline{\text{Z}}$ |

(relationship between power supply voltage and function mode)

Figure 4:
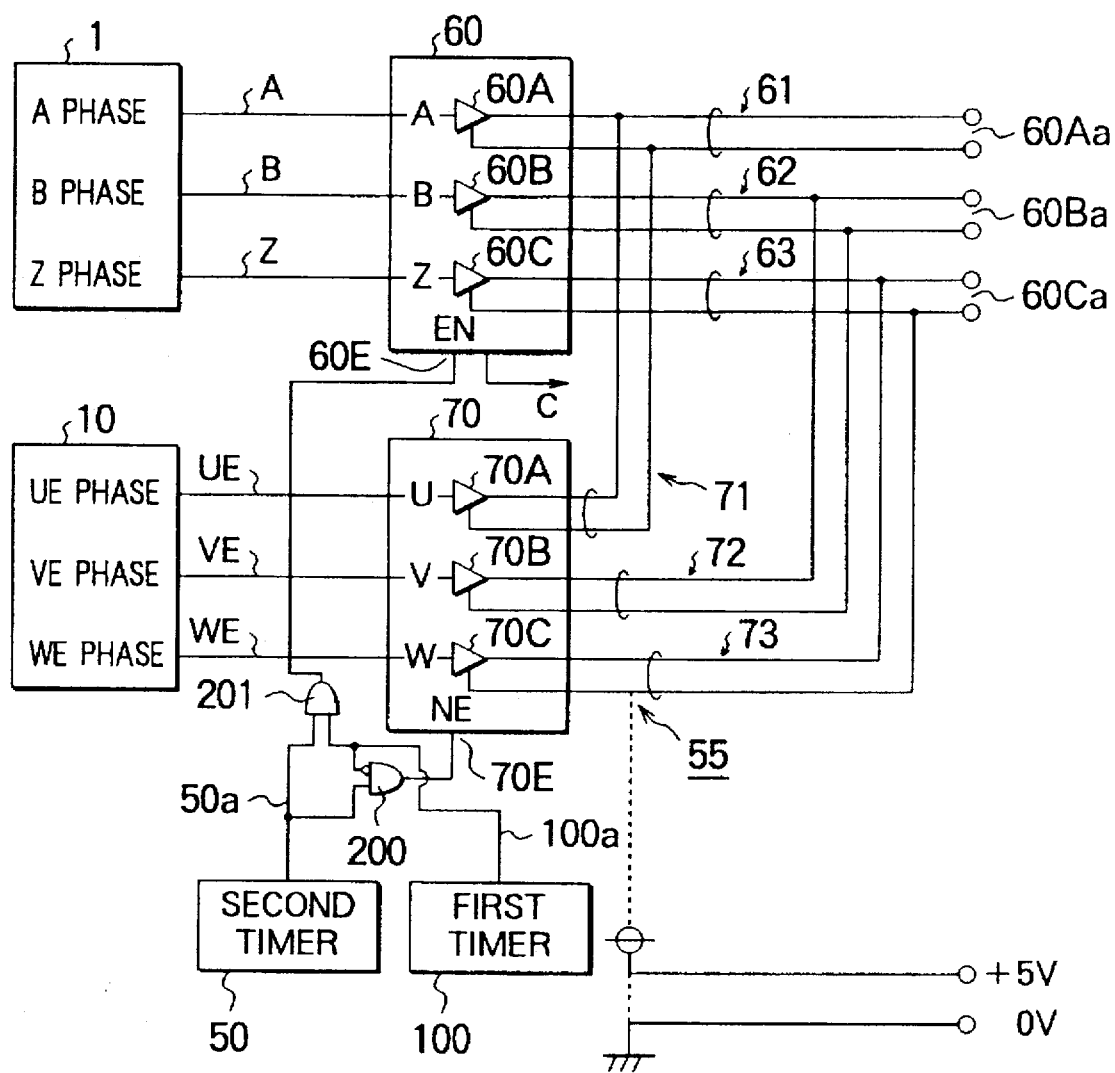
FIG. 4 is a block diagram showing another embodiment of the servo motor encoder in FIG. 2.

First mode: high-impedance state (HZ)
Second mode: servo motor magnetic pole position detection signal output state (UE, VE, WE)
Third mode: A, B, and Z signal output state In another embodiment shown in FIG. 4, the incremental signals A, B, and Z are input to three first driver sections 60A, 60B, and 60C of a first line driver 60 having an enable terminal 60E, respectively, and the first driver sections 60A to 60C are connected to pairs of output terminals 60Aa, 60Ba, and 60Ca through pairs of signal lines 61, 62, and 63, respectively.

The servo motor magnetic pole position detection signals UE, VE, and WE are input to three second driver sections 70A, 70B, and 70C of a second line driver 70. having a disable terminal 70E, and pairs of signal lines 71, 72, and 73 connected to the second driver sections 70A, 70B, and 70C are connected in such a manner that the servo motor magnetic pole position detection signals UE, VE, and WE are output from the output terminals 60Aa, 60Ba, and 60Ca through the pairs of signal lines 71, 72 and 73 and the signal lines 61, 62, and 63. The first timer output 100a of the first timer 100 is input to one terminal of a first gate 200 constituted by an AND circuit and having a NOT input and to one terminal of a second gate 201 constituted by an AND circuit. A second timer output 50a of a second timer 50 is input to the other terminals of the gates 200 and 201, and an output from the first gate 200 is input to the disable terminal 70E, and an output from the second gate 201 is input to the enable terminal 60E. Note that the operation of each of the timers 50 and 100 is the same as that in FIG. 1.

Therefore, as in the operation shown in FIG. 3, in the period of the first timer output 100a of the first timer 100, the line drivers 60 and 70 output high-impedance states. When the second timer 50 is started, the second line driver 70 operates to output only the signals UE, VE, and WE from the output terminals 60Aa, 60Ba, and 60Ca. When the timer output 50a goes to H level, the first line driver 60 operates to output only the signals A, B, and Z from the output terminals 60Aa, 60Ba, and 60Ca. This operation is performed in the same manner as in FIG. 2.

Therefore, as in the arrangement shown in FIG. 2, the incremental signals A, B, and Z (A, $\overline{\text{A}}$, B, $\overline{\text{B}}$, Z, and $\overline{\text{Z}}$) or the servo motor magnetic pole position detection signals UE, VE, and WE are selectively output from the output terminals 60Aa, 60Ba, and 60Ca.

Since the servo motor encoder according to the present invention is arranged as described above, the following effect can be obtained. More specifically, incremental signals and servo motor magnetic pole position detection signals are selectively output by an arrangement which is constituted by a multiplexer, a line driver, and a pair of timer signals or an arrangement which is constituted by a pair of line drivers and a pair of timer signals, by using common signal lines and common output terminal. For this reason, the number of output signal lines can be reduced from 12 to 6. As a result, a considerable decrease in the number of signal lines can be achieved.

What is claimed is:

1. An encoder output method comprising the steps of generating three phase incremental signals (A, B, Z) from an incremental signal generator (1) through a line driver (2, 60, 70), and outputting three phase servo motor magnetic pole position detection signals (UE, VE, WE) from a servo motor magnetic pole position detection signal generator (10) through said line driver (2, 60, 70 characterized in that after a power supply (Vcc) is turned on, a high-impedance state (HZ) from said line driver 2, 60, 70) is output in synchronism with a first timer output (100a) from a first timer (100), and the servo motor magnetic pole position detection signals (UE, VE, WE) and the incremental signals (A, B, Z) are output in synchronism with a second timer output (50a) from a second timer (50).

2. A servo motor encoder having an incremental signal generator (1) for generating three phase incremental signals (A, B, Z) and a servo motor magnetic pole position detection signal generator (10) for generating three phase servo motor magnetic pole position detection signals (UE, VE, WE), comprising a multiplexer (30) which receives the signals (A, B, Z, UE, VE, WE) and has three switching sections (30A–30C), one line driver (2) connected to said multiplexer (30) and having driver sections (2A, 2B, 2C) corresponding to said switching sections (30A–30C), a first timer (100) connected to said line driver (2), a pair of output terminals (2Aa, 2Ba, 2Ca) connected to said driver sections (2A, 2B, 2C), and a second timer (50) connected to said multiplexer (30), characterized in that after a power supply is turned on, a high-impedance state (HZ) from said line driver (2) is output in synchronism with a first timer output (100a) from the first timer (100), and the servo motor magnetic pole position detection signals (UE–WE) and the incremental signals (A, B, Z) are output in synchronism with a second timer output (50a) from said second timer (50).

3. A servo motor encoder having an incremental signal generator (1) for generating three phase incremental signals (A, B, Z) and a servo motor magnetic pole position detection signal generator (10) for generating three phase servo motor magnetic pole position detection signals (UE, VE, WE), comprising a first line driver (60) having three first driver sections (60A–60C) corresponding to the incremental signals (A, B, Z), a second line driver (70) having three second drivers (70A–70C) corresponding to the servo motor magnetic pole position detection signals (UE, VE, WE), a pair of output terminals (60Aa, 60Ba, 60Ca) respectively connected to said first driver sections (60A–60C), and first and second timers (100, 50) connected to an enable terminal (60E) of said first line driver (60) and a disable terminal (70E) of said second line driver (70), characterized in that after a power supply is turned on, a high-impedance state (HZ) from said line drivers (60, 70) is output in synchronism with a first timer output (100a) from the first timer (100), and the servo motor magnetic pole position detection signals (UE–WE) and the incremental signals (A, B, Z) are output in synchronism with a second timer output (50a) from said second timer (50).

\* \* \* \* \*